United States Patent
Krall et al.

[11] Patent Number: 6,101,452
[45] Date of Patent: Aug. 8, 2000

[54] METHOD AND APPARATUS FOR DISPENSING FLUIDS

[75] Inventors: Michael L. Krall, El Cajon; David P. Caird, Santee, both of Calif.

[73] Assignee: Innovative Medical Services, El Cajon, Calif.

[21] Appl. No.: 09/195,771

[22] Filed: Nov. 18, 1998

Related U.S. Application Data

[63] Continuation-in-part of application No. 08/814,621, Mar. 10, 1997.

[51] Int. Cl.$^7$ ........................................................ G06F 19/00
[52] U.S. Cl. ........................... 702/55; 702/50; 702/52; 702/100; 137/101.25
[58] Field of Search ............................. 702/100.5, 52, 702/55; 137/487.5, 625.65, 898, 488, 101.25, 896–897; 73/149; 222/52, 61

[56] References Cited

U.S. PATENT DOCUMENTS

| | | | |
|---|---|---|---|
| 3,669,312 | 6/1972 | Kuckens et al. | |
| 4,145,091 | 3/1979 | Bueler et al. | 303/118.1 |
| 4,676,914 | 6/1987 | Mills et al. | 210/741 |
| 4,907,620 | 3/1990 | Becker et al. | 137/893 |
| 4,964,533 | 10/1990 | Allington et al. | |
| 5,012,955 | 5/1991 | Shannon | 222/61 |
| 5,033,644 | 7/1991 | Tentler | |
| 5,170,361 | 12/1992 | Reed | 364/528.18 |
| 5,272,920 | 12/1993 | Stephenson et al. | 73/301 |
| 5,314,825 | 5/1994 | Weyrauch et al. | |
| 5,319,964 | 6/1994 | Stephenson et al. | 73/149 |
| 5,480,063 | 1/1996 | Keyes et al. | 222/64 |
| 5,481,260 | 1/1996 | Buckler et al. | 340/870.09 |
| 5,526,679 | 6/1996 | Filippi et al. | 702/51 |
| 5,603,430 | 2/1997 | Loehrke et al. | 222/1 |
| 5,636,653 | 6/1997 | Titus | 137/14 |
| 5,680,960 | 10/1997 | Keyes et al. | 222/64 |
| 5,687,092 | 11/1997 | Bretmersky et al. | 702/100 |
| 5,730,819 | 3/1998 | Retti | 156/71 |

*Primary Examiner*—James P. Trammell
*Assistant Examiner*—Cuong H. Nguyen
*Attorney, Agent, or Firm*—Jaquez & Associates; Martin J. Jaquez, Esq.

[57] ABSTRACT

A method and apparatus for dispensing fluids in response to a user request for a specified amount of the fluid. A microprocessor opens and closes a fluid port for predetermined amounts of time to control the amount of fluid dispensed. The microprocessor monitors the elapsed time and the amount of fluid that has been dispensed since the last time the filter was serviced. In one preferred embodiment, the amount of fluid that is dispensed is measured by continuously monitoring the volume of fluid flowing through the apparatus. A pressure measurement device allows the microprocessor to monitor the fluid pressure. The microprocessor prevents fluid from being dispensed if the pressure is not within a predetermined range of tolerances. The fluid port is opened and closed by activating and deactivating a solenoid. A keypad allows the user to input the amount of fluid that is to be dispensed. A "Wait" period is imposed between the time that the user initiates the first stage and the time the user may initiate the second stage. The microprocessor does not open the fluid port if a "Failure" condition exists. An LCD is provided to display the amount of fluid that the user has requested. In an alternative embodiment, a bar code scanner or other input device allows the user to automatically input the amount of fluid that is to be dispensed.

26 Claims, 11 Drawing Sheets

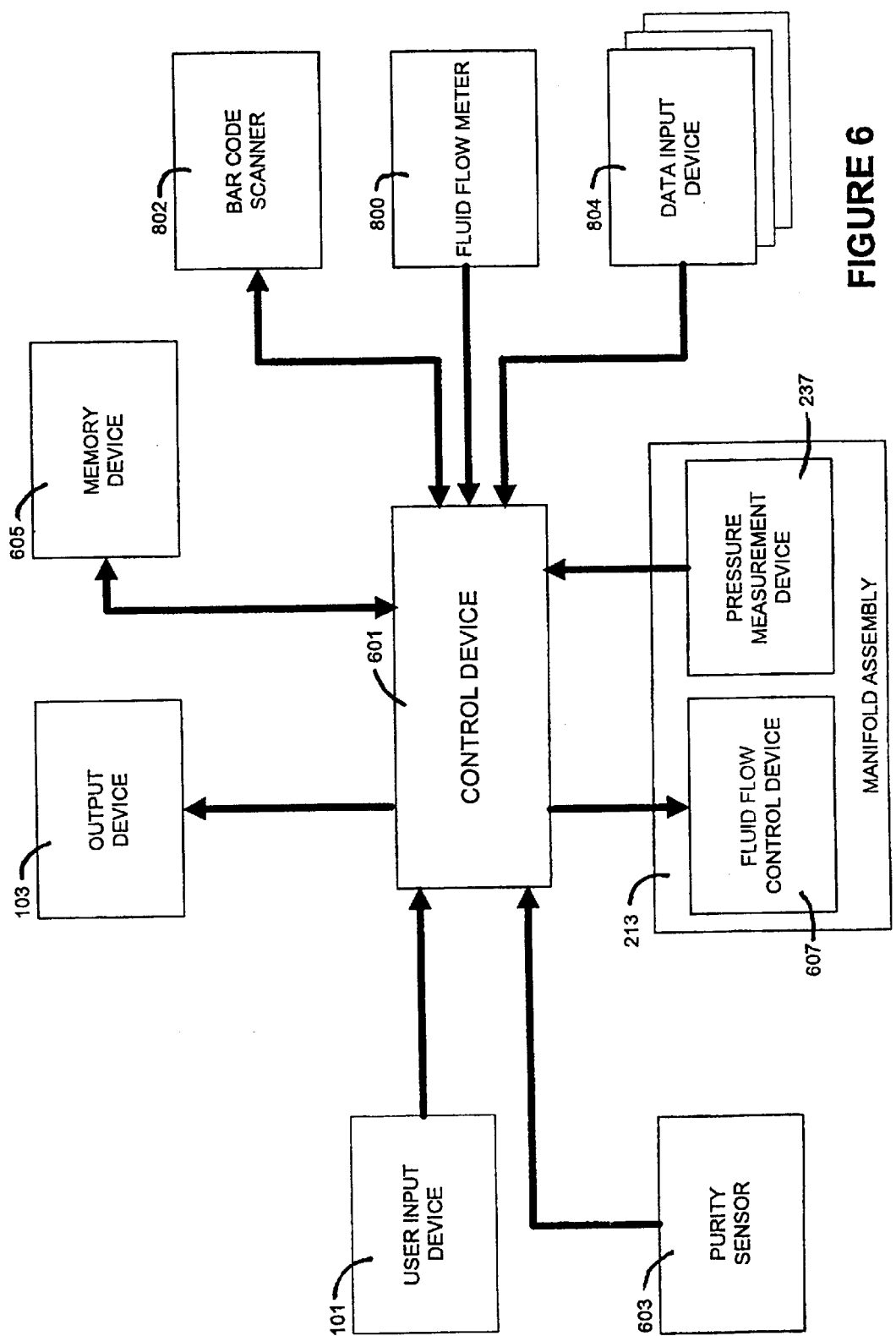

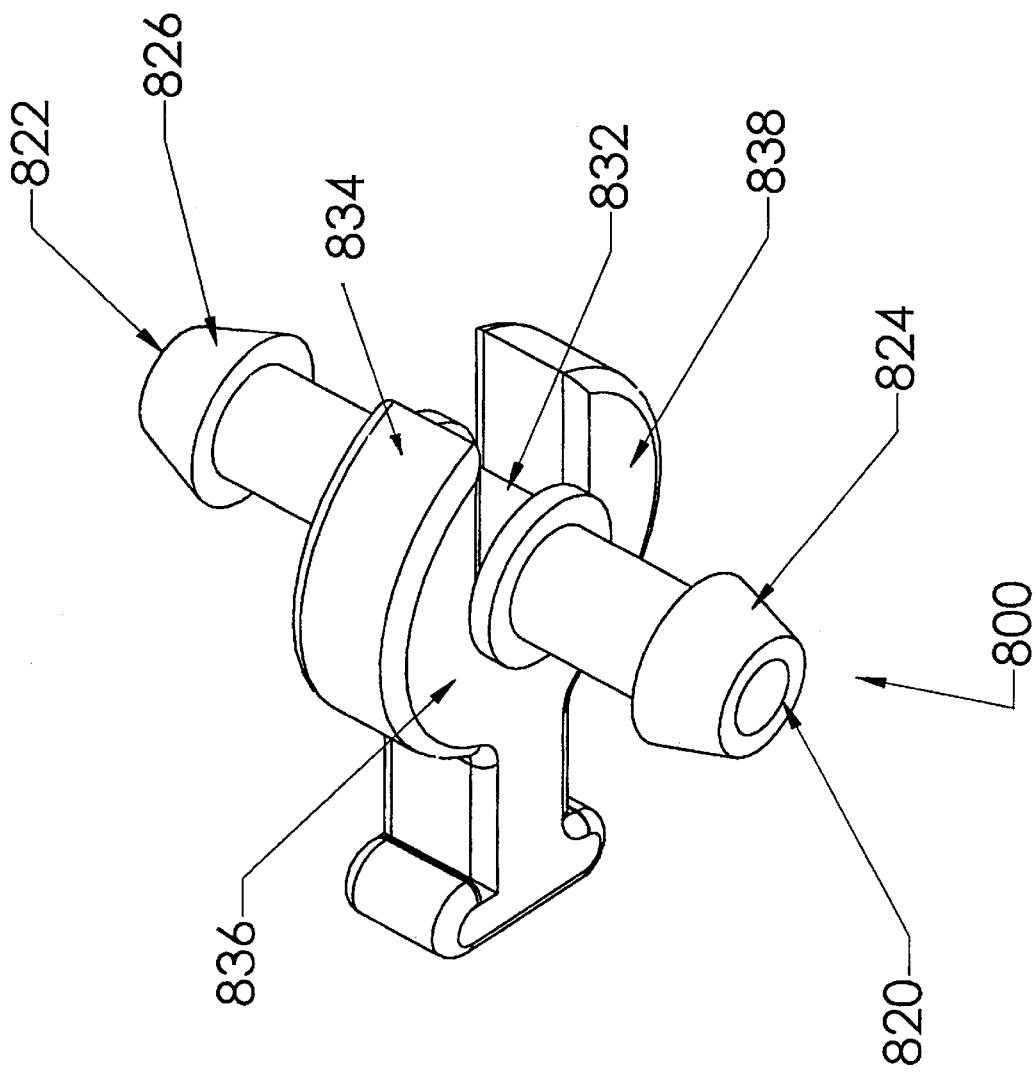

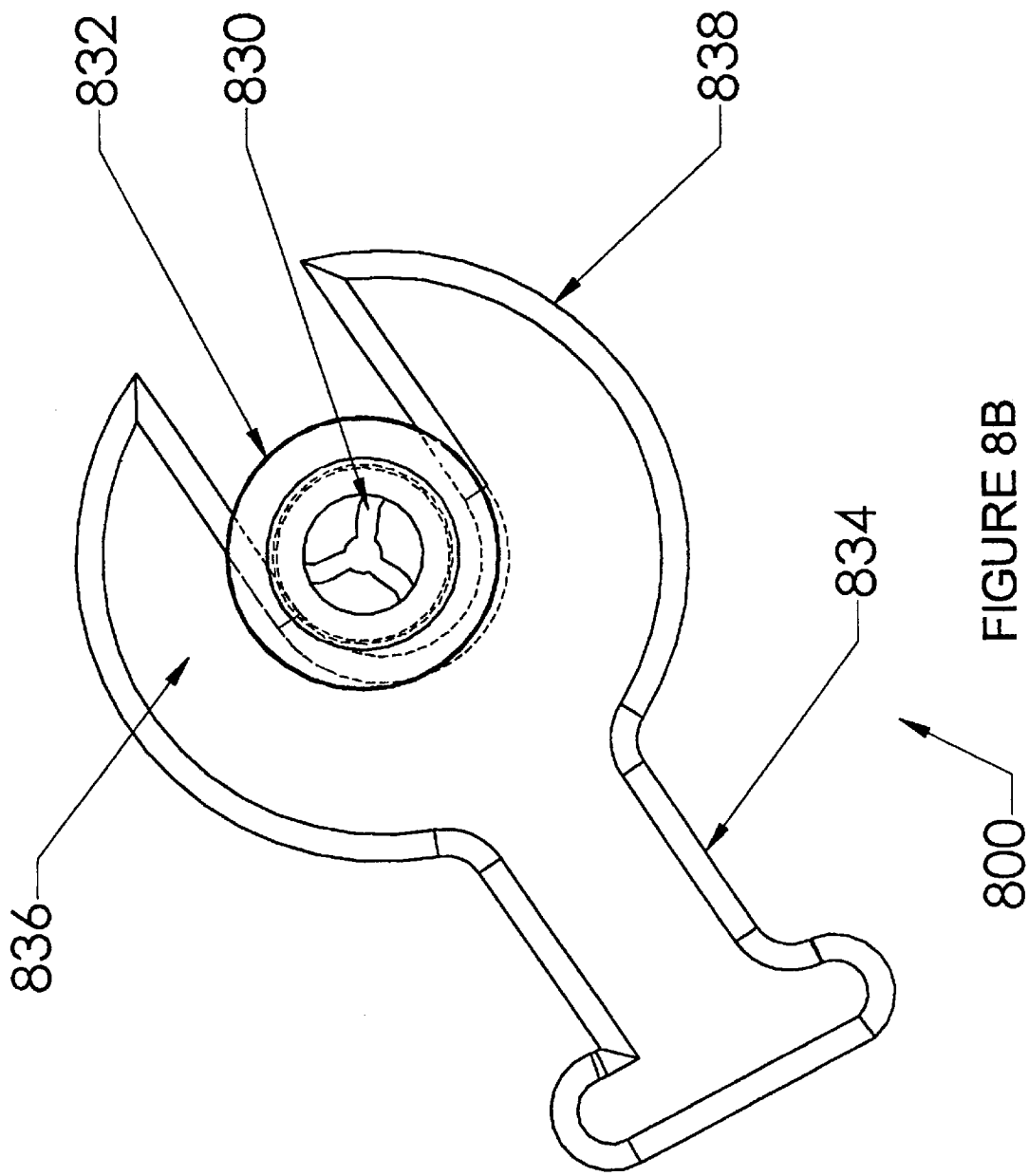

METHOD AND APPARATUS FOR DISPENSING FLUIDS

CROSS REFERENCE TO RELATED APPLICATION

This application is a continuation-in-part of application Ser. No. 08/814,621 of Michael L. Krall and David P. Caird, filed on Mar. 10, 1997, entitled "METHOD AND APPARATUS FOR DISPENSING FLUIDS".

BACKGROUND OF THE INVENTION

1. Field of the Invention

This invention relates to dispensing fluid, and more particularly to a method and apparatus for dispensing fluid on demand in precisely measured quantity.

2. Description of Related Art

Many situations call for mixing pre-measured amounts of a fluid with other fluids, powders, etc. For example, pharmacists are frequently called upon to reconstitute medications, such as antibiotics for ingestion primarily by infants and small children. The medication typically is provided to the pharmacist as a powder or concentrate which must be reconstituted by mixing the antibiotic with filtered water. Pharmacists reconstitute the medication upon receipt of a prescription from a customer.

Traditionally, a pharmacist would have available a container of filtered water suitable for use in reconstituting medications. The pharmacist would measure the proper amount of filtered water to be used in reconstituting the medication by pouring the filtered water from a relatively large container into a graduated cylinder, or other such receptacle for measurement. The measured amount of filtered water would then be combined with the medication. Accordingly, the pharmacist must maintain a sufficient supply of filtered water. Furthermore, the pharmacist must maintain a set of graduated cylinders or other such receptacles for measuring filtered water. In addition, the process is relatively labor intensive.

It is common for pharmacists to purchase filtered water from a supplier rather than have a filter which can be used locally to filter tap water. Filtered water is typically purchased in containers that can be connected by tubing to a valve that allows the user to dispense the filtered water, thus making it more convenient for the pharmacist to dispense the water. The tube enters the container so that the water can be siphoned from the container. In order to cause the fluid to flow from the container, the container is typically placed at a relatively high elevation with respect to the point of delivery, to allow the fluid to be siphoned. The pharmacist must then gently orally suck on the dispensing end of the tube in order to prime the tube and allow the filtered water to flow. Once the tube has been primed, the flow of filtered water is commonly controlled by compressing the tube using a clip. This system presents several problems. First, having the pharmacist orally suck on the end of the tube contaminates the filtered water that then passes through the tube. Second, over time, purchasing filtered water is far more expensive than filtering tap water at the pharmacy. Third, the pharmacist must accurately measure the amount of water that is dispensed. Therefore, many pharmacists are installing water filter systems which provide the pharmacy with a ready supply of filtered water, without the need to suck on the end of a tube. However, the pharmacist must still accurately measure the amount of filtered water that is to be used to fill each prescription. Fourth, the tip from which water is dispensed typically comes into contact with the prescription. Therefore, there is a danger of cross-contamination. In addition, the tip may become dirty and contaminated from other foreign substances. Still further, due to the structure of the tip (i.e., the relatively thin passage through the tip), the tip is difficult to clean. Therefore, a bacterial build-up can occur within the tip.

In accordance with one system which is commercially available from Innovative Medical Services of San Diego, known as the "FillMaster", a water filter is coupled to a water dispenser which allows a pharmacist to open a first valve and release water under pressure from a pressurized holding tank within the filtration system into a graduated holding tank within a dispenser. The gradations on the graduated holding tank and the water level are visible to the pharmacist as the water fills the graduated holding tank. The pharmacist closes the valve once the graduated holding tank within the dispenser is holding the desired amount of filtered water. A second valve allows the filtered water within the graduated holding tank to be released into a container for use by the pharmacist. This system eliminates the need for the pharmacist to suck on the end of the dispensing tube. Furthermore, the filter provides filtered water which may be used in reconstituting medications.

Nonetheless, the pharmacist must be diligent in filling the graduated holding tank with the proper amount of filtered water. Still further, the filters within the filtration system must be replaced at regular intervals which depend upon one of three conditions: (1) time; (2) usage; and (3) purity of the water being output. Therefore, the pharmacist must maintain records as to when the filter was last serviced, must maintain records reflecting the amount of water which has been filtered since the last time the filter was serviced, and must regularly verify that the purity of the water is within acceptable tolerances. Furthermore, the proper method to be used to reconstitute a medication is first to add a portion of the total amount of filtered water to the medication; second to stir the medication and the filtered water; and third to add the remainder of the filtered water to the medication. It is very important that this process be followed when reconstituting a prescription for several reasons. For example, if the entire amount of fluid is dispensed at one time, the combination of fluid and the powdered antibiotic may overflow the container, since the total volume of fluid and powder is greater before mixing than after. If any portion of the prescription overflows the container, then the entire prescription must be discarded. In addition, for some medications, the powder may not properly dissolve if this proper procedure is not followed. There is currently no mechanism available for ensuring that the pharmacist performs this process properly (i.e., for ensuring that the pharmacist does not release the entire amount of filtered water at one time).

In addition, most medications are packaged in bottles that are coded (usually using the well-known "bar code" method) with information pertaining to the medication. For example, in addition to containing other specifics about the medication, the coded information often identifies the manufacturer, the medication's name (sometimes including both the brand and generic names), dosage strength, and expiration date of the medication. There is currently no available mechanism which allows a pharmacist to use this information to automate the prescription filling process. More specifically, although the coded prescription bottles contain all the pertinent information necessary to accurately reconstitute the enclosed medications (i.e., knowing the medication type and dosage strength a pharmacist can access a well-known pharmaceutical reference to determine the amount of filtered water needed to reconstitute the medication), there is no currently available means for taking advantage of this information for the purpose of automating the medication reconstitution process. Therefore, it is desirable to provide a method and apparatus which can utilize the presently available bar-coded (or otherwise encoded) data to automate the reconstitution process. It is also desirable to provide a method and apparatus which can read the expiration date information and warn the user (typically a pharmacist) that the medication has expired and therefore should not be used.

Accordingly, it is desirable to provide a system which ensures that the proper amount of water is dispensed. Furthermore, it is desirable to provide a system which indicates when filters should be serviced as a function of volume, the duration between the last service, and purity of the water. Additionally, in a pharmaceutical environment, it is desirable to provide a method and apparatus that dispenses the correct amount of filtered water for reconstituting medications based upon coded information about the medications. The present method and apparatus for dispensing fluids provides such a system.

SUMMARY OF THE INVENTION

The present invention is a method and apparatus for dispensing fluids in response to a user request for a specified amount of the fluid. In one embodiment of the invention fluids are dispensed in response to coded data which is input to the invention by a scanning process or some other means. The present invention uses a central control device, such as a microprocessor, to open and close a fluid port for predetermined amounts of time to control the amount of fluid that is dispensed. The central control device also preferably monitors the elapsed time and the amount of fluid that has been dispensed since the last time the filter was serviced. In addition, in one embodiment in which the fluid is filtered water, the microprocessor preferably monitors the purity of the filtered water. Furthermore the preferred embodiment of the present invention preferably employs a disposable tip. The shape of the tip is preferably formed to provide an output stream which aids in mixing the prescription as fluid is dispensed.

The fluid is preferably contained within a pressurized holding tank. A regulator preferably maintains the pressure in the holding tank within a relatively narrow range of pressures. By maintaining the pressure within a relatively narrow range of pressures, the amount of fluid that is dispensed can be determined as a function of the amount of time the central control device allows the fluid to flow. In one embodiment, a pressure measurement device is provided in a fluid line that carries the fluid from the pressurized holding tank to the fluid port. The pressure measurement device is operatively coupled to the central control device. In this embodiment, the pressure measurement device provides continuous "feedback" signals that indicate the fluid line pressure at any instance in time. These feedback signals allow the central control device to continuously monitor the pressure in the holding tank. In one embodiment, the central control device can dynamically change the amount of time fluid is allowed to flow based changes in fluid line pressure indicated by the pressure feedback signals. Thus, in this embodiment, the present invention dispenses the same desired amount of fluid under varying fluid line pressure conditions.

In a preferred embodiment, the amount of fluid dispensed by the present invention is monitored directly using a fluid flow meter. In this embodiment, the fluid flow meter directly measures the volume of fluid that passes through the fluid line. In this embodiment the pressure measurement device is used to ensure that pressure in the fluid line is maintained within a predetermined desired range. The central control device prevents fluid from being dispensed if the pressure is not within a predetermined range of tolerances, thus preventing the dispenser from dispensing an amount of fluid that differs by more than a predetermined amount from the amount specified by a user or by an input mechanism such as a bar code scanner.

In accordance with one embodiment of the present invention, the fluid port is opened and closed by activating and deactivating a solenoid. When the solenoid is deactivated, a piston is held outward in a first position. In the first position, the piston blocks both an inlet and an outlet from a manifold. When the solenoid is activated, the piston is retracted, allowing fluid to flow out from the outlet, through the solenoid, and into the inlet. In an alternative embodiment of the present invention, the piston of the solenoid only blocks either the inlet or the outlet. In yet another embodiment of the present invention, a conventional valve may be controlled by the central control device to determine whether fluid flows.

A user input device, such as a keypad, is provided to allow the user to input the amount of fluid that is to be dispensed. In addition, a "Fill" button is provided which allows the user to initiate a dispensing operation once the amount of fluid to be dispensed has been input. An alternative embodiment of the present invention includes one or more additional input devices which facilitate an automated fluid dispensing process. For example, in one alternative embodiment a bar code scanner is provided which inputs scanned information about a medication into the central control device. A "Scan" button is provided which allows the user to initiate a scanning operation, which, in turn, initiates a dispensing operation.

In this embodiment, the amount of fluid (typically filtered water) dispensed by the fluid dispenser depends upon the scanned information provided by the bar code scanner. An alternative embodiment of the invention includes one or more optional additional input devices. The additional input devices provide alternative means for inputting the amount of fluid to be dispensed.

Dispensing operations are preferably performed in two stages. In the first stage, a first portion of the requested fluid is dispensed. The user must then initiate the second stage by again pressing the Fill button. In accordance with one embodiment of the present invention, a "Wait" period is imposed on the user between the time that the user initiates the first stage and the time the user may initiate the second stage. In accordance with one embodiment, the Wait period is a predetermined duration. In another embodiment, the user can either set or adjust the duration of, or eliminate, the Wait period.

In addition, in accordance with one embodiment of the present invention, the central control device does not open the fluid port if a "Failure" condition exists. A Failure condition preferably includes incorrect power supply levels, unacceptable filter status, or an incorrect pressure within the lines between the pressurized holding tank and the fluid port. In an alternative embodiment a Failure condition is triggered when an expired medication is scanned during a scanning operation. In this embodiment, the present invention informs the user to discard the expired medication. In addition, in accordance with one embodiment of the present invention, the dispenser includes an audible alarm which is activated whenever a failure condition arises.

An alphanumeric display device, such as an LCD (liquid crystal display), is preferably provided and coupled to the central control device to display the amount of fluid that the user has requested. Preferably the display device is also used to dynamically display how much fluid has been dispensed thus far in a currently active dispensing operation. The display is also preferably used to provide the user with instructions throughout a dispensing procedure to simplify the procedure. In an alternative embodiment, the display presents to the user information which is scanned by the bar code scanner. In accordance with an alternative embodiment, the amount of fluid that has been dispensed is displayed on a second display. In accordance with one such embodiment, the second display is a series of LEDs (light emitting diodes). Alteratively, the second display is a second alphanumeric LCD display. An LCD or LED type display is also preferably provided for displaying the status of the filters (i.e., whether the filters require service). In an alternative embodiment, a speaker or other sound transducer is coupled to the central control device to provide audible or verbal information to the user. In one such alternative, the verbal information is provided in a natural language understandable by the user (e.g., in English).

The alphanumeric display (or in an alternative embodiment, the speaker) is also preferably used to request the user to enter through the keypad a "Start-Up" code that indicates when the filters were sold and when they were last serviced. The code must be entered before any fluid can be dispensed. The Start-Up code is preferably stored within the dispenser. Therefore, the Start-Up code need only be entered once unless the stored code is corrupted, in which case the user must reenter the Start-Up code. In accordance with one embodiment of the present invention, the system ensures that the user register the dispenser with a party, such as the manufacturer or a government agency, by requiring the user to attain the Start-Up code from the party with whom the user is to register.

In accordance with one embodiment of the present invention, the central control device is powered by a power pack. The power pack includes a power source, such as a battery, and a memory storage device, such as an EEPROM (electrically erasable programmable read only memory). In accordance with one embodiment of the present invention, a monitor is provided to monitor the status of the power source, and thus determine whether the power source is operating below a performance threshold (i.e., if batteries are used, whether the batteries have a diminished charge, etc.). In accordance with one embodiment of the present invention, the Start-Up code is stored within the memory storage device. In an embodiment in which the central control device is a programmable controller, the memory storage device also stores the program that is executed by the programmable controller.

BRIEF DESCRIPTION OF THE DRAWING

FIG. 6 is a simplified block diagram of the electrical interconnection between components of one embodiment of the present invention.

FIG. 8A is a perspective view of the fluid flow meter adapted for use in the present invention.

FIG. 8B is a cross-sectional view of the fluid flow meter of FIG. 8A.

Like reference numbers and designations in the various drawings refer to like elements.

DETAILED DESCRIPTION OF THE INVENTION

Throughout this description, the preferred embodiment and examples shown should be considered as exemplars, rather than limitations on the present invention.

Overview

The present invention is a method and an automated fluid dispenser for dispensing a measured amount of fluid in response to a user's request. The present invention preferably includes a water filter system which removes impurities from tap water. The filtered water is primarily intended to be used to reconstitute medications. However, the present invention can be used to dispense measured amounts of fluid in response to a user request for any purpose.

Figure 1:
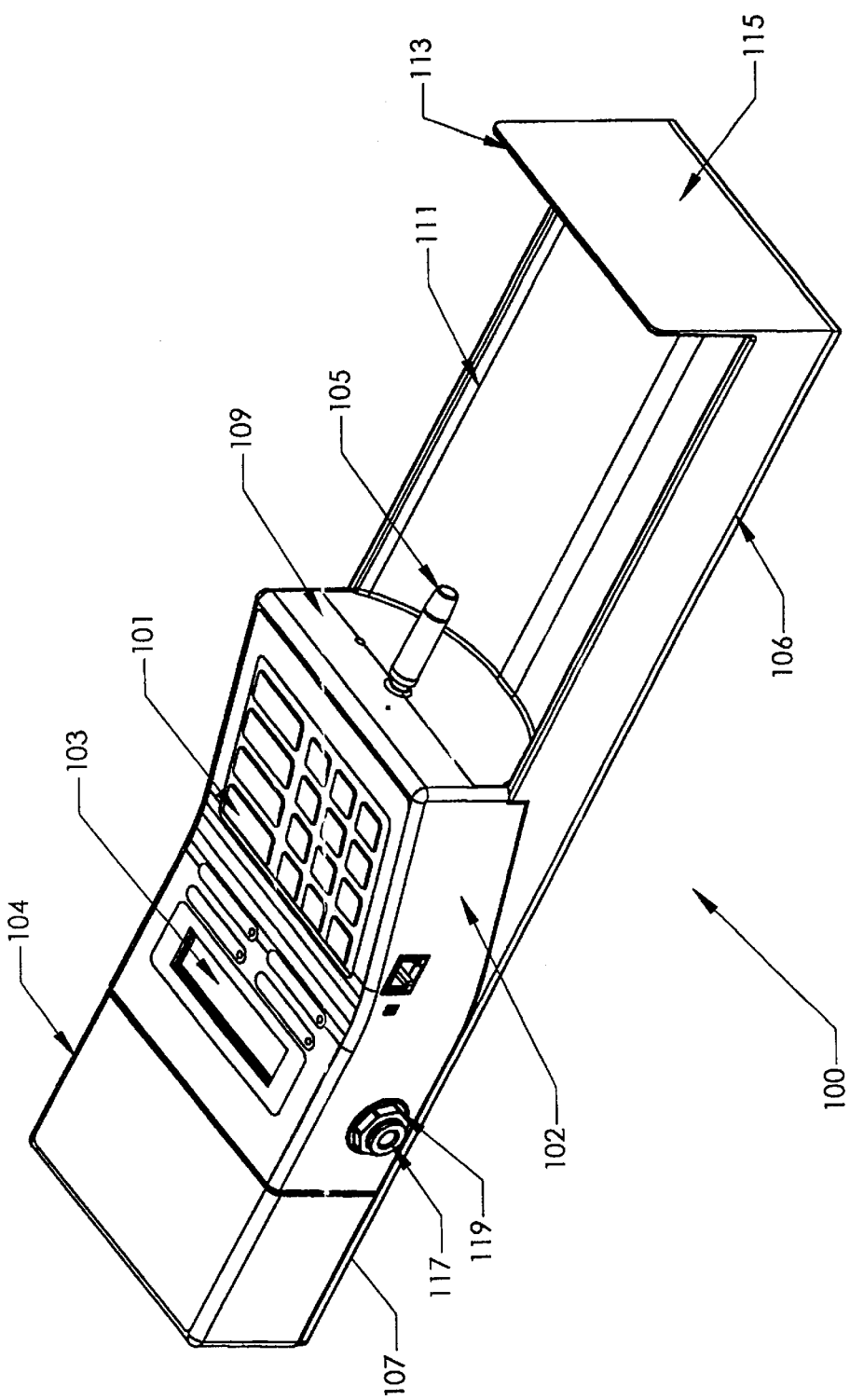
FIG. 1 is an illustration of a dispenser in accordance with one embodiment of the present invention.

One embodiment of the dispenser 100 of the present invention is shown in FIG. 1. The dispenser 100 preferably includes a housing 102, having an upper portion 104 and a lower portion 106. The upper portion 104 includes a user input device 101, such as the keypad shown in FIG. 1. Alternatively, the user input device may be a mouse, a light pen, a touch screen, a microphone, or any other such device with which the user can input information to the dispenser 100. An output device 103, such as the LCD (liquid crystal display) shown in FIG. 1, is preferably included in the upper portion 104 to provide the user with positive feedback regarding the information that the user inputs, and to allow the dispenser 100 to communicate information to a user. For example, in accordance with one method of the present invention, a user enters a number through the user input device 101. The number represents the amount of fluid which the user desires to have dispensed. As each digit of the number is input by the user, that number is preferably displayed on the output device 103 to acknowledge to the user that the information has been correctly received.

In accordance with one embodiment of the present invention, the dispenser 100 is intended to be mounted with the back 107 of the dispenser 100 flush to a wall (not shown). The dispenser 100 is preferably mounted with the output device at a height of approximately 4 feet. In the embodiment of the present invention shown in FIG. 1 in which the user input 101 is a keypad, the housing 102 of the dispenser 100 is formed to present the user input 101 to the user at a desired angle with respect to a horizontal plane. In the embodiment shown in FIG. 1, the user input 101 forms a 75 degree angle with respect to the horizontal plane. Near the base of the user input 101, the housing 102 forms an inverted shelf 109 generally parallel with a horizontal plane. A fluid output port 105 is provided through the inverted shelf 109. A rear wall 111 in the lower portion 106 couples the upper portion 104 with a shelf 113. The shelf 113 has a top surface 115 that is essentially horizontal and directly below the fluid output port 105 when the dispenser is properly mounted. Alternatively, the front of the shelf 113 is raised slightly with respect to the rear of the shelf 113, such that the shelf 113 has a slight pitch. The shelf 113 of the lower portion 106 is intended to support a container (not shown) into which fluid is to be dispensed during a dispensing operation. However, it should be understood that in an alternative embodiment of the present invention, no such shelf is provided.

A fluid input port 117 is provided on a side of the dispenser 100. The fluid input port 117 preferably has a fluid coupling 119 which provides a mechanism for coupling a fluid conduit to the dispenser 100.

Figure 2:
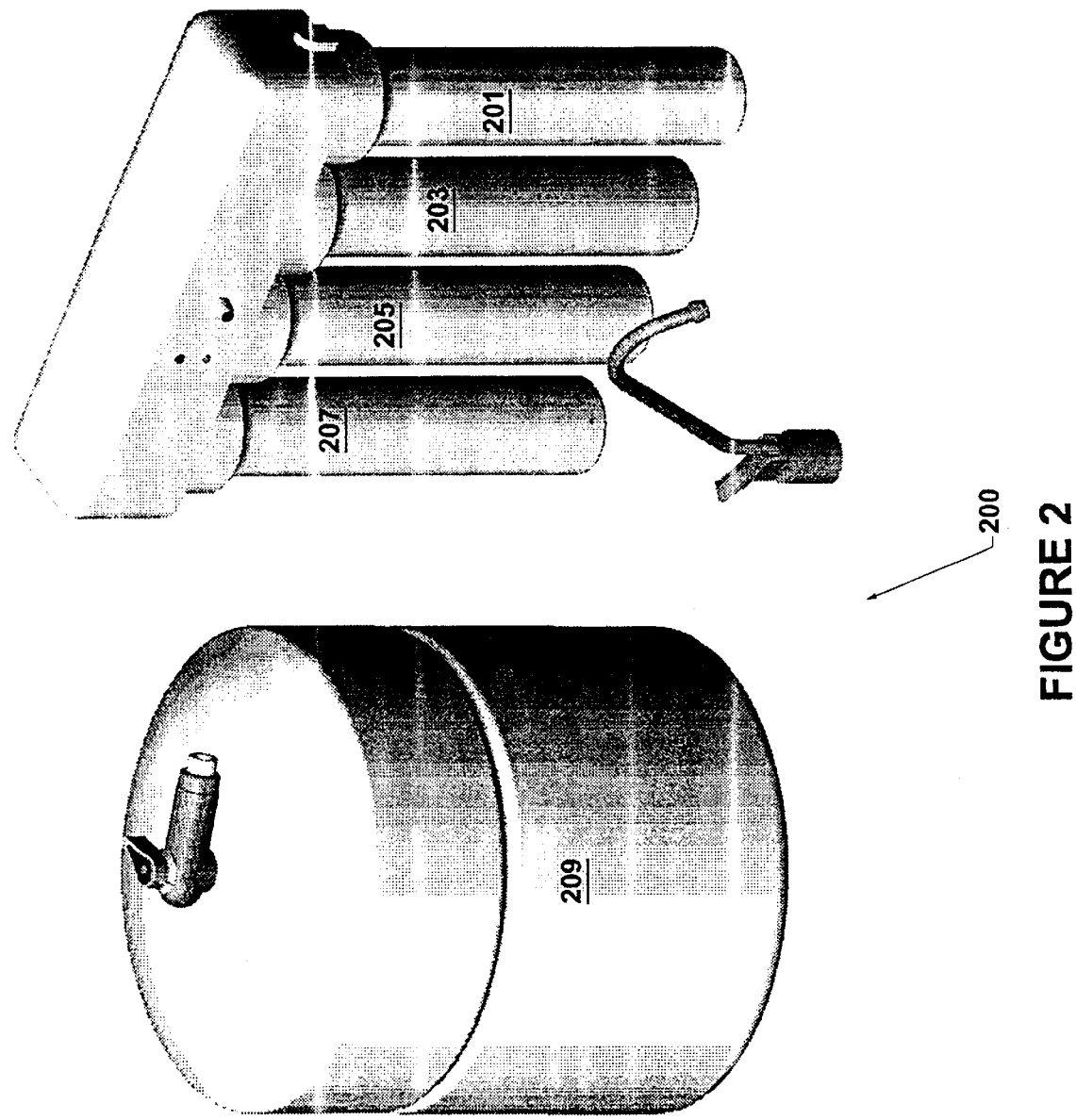
FIG. 2 is an illustration of a filter assembly used in accordance with one embodiment of the present invention.

The present invention also includes a filter, such as filter assembly 200 shown in FIG. 2. The filter includes a sediment filter 201, a first multi-stage carbon filter 203, an RO (reverse osmosis) membrane 205, a second multi-stage carbon filter 207, and a pressurized holding tank 209. The filter assembly 200 is coupled to a manifold assembly 210 (FIG. 3).

Figure 3:
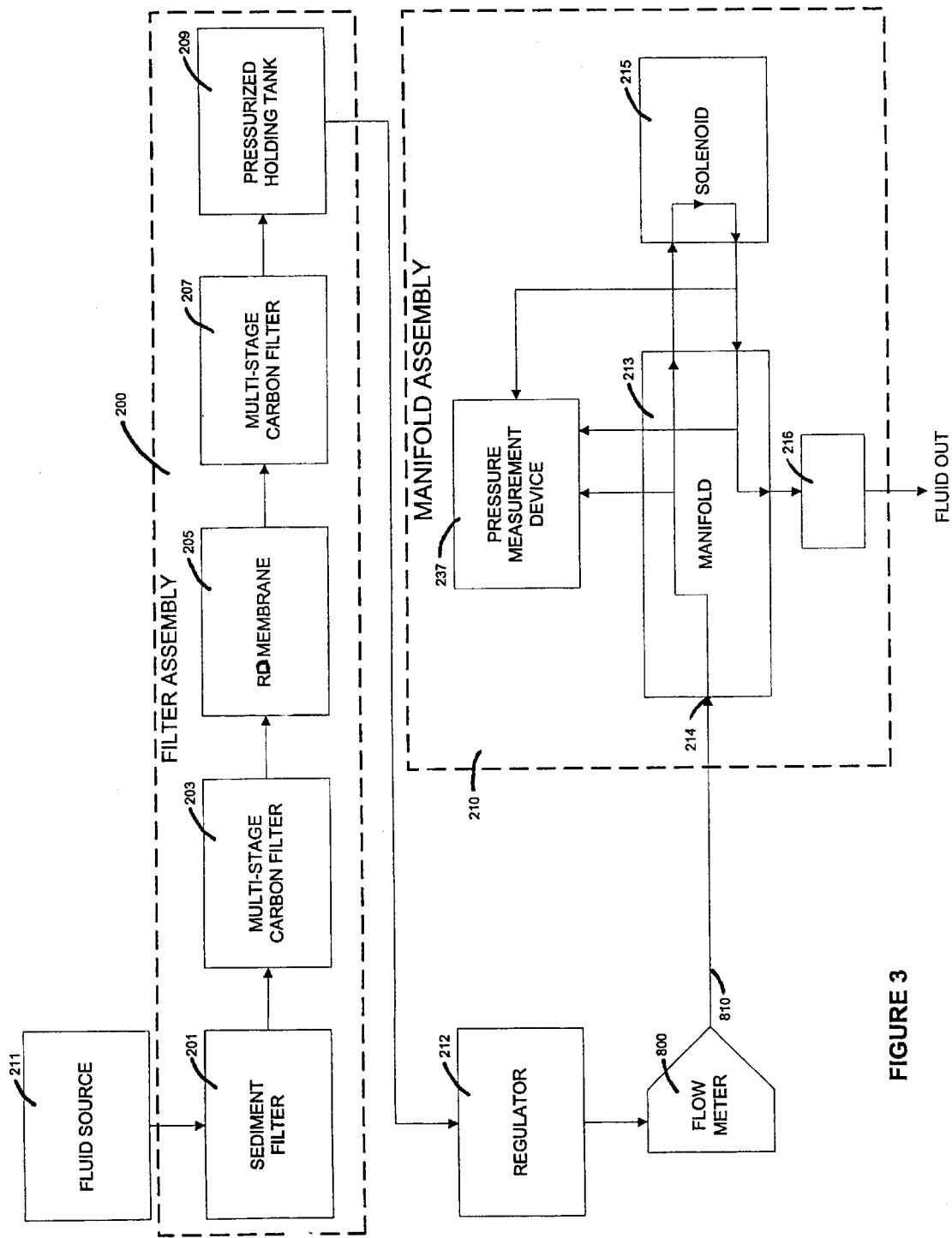
FIG. 3 is a block diagram which illustrates the flow path of fluid through the filter and manifold assembly of the present invention.

FIG. 3 is a block diagram which illustrates the flow path of fluid through the filter assembly 200 and the manifold assembly 210. A fluid input source 211 is preferably a conventional plumbing fixture which outputs tap water. However, the fluid input source 211 may be any source of fluid which can deliver the fluid with a minimum output pressure. The minimum output pressure is required because the pressurized holding tank preferably has no internal mechanism for pressurizing the fluid. Rather, the fluid is pressurized by the source. Alternatively, the present invention includes a pump to pressurize the fluid within the fluid flow path through the filter assembly 200. The filter assembly 200 is preferably in fluid contact with an in-line pressure regulator 212. The pressure regulator aids in maintaining the proper output pressure to the manifold 213. The pressure regulator 212 is in fluid contact with the manifold assembly 210 through a fluid input port 214 in a manifold 213, which is mechanically aligned with the fluid input port 117 in the housing 102. A solenoid 215 is preferably mechanically coupled to the manifold 213 as described in more detail hereinbelow with reference to FIGS. 4 and 5.

In addition, as described below in more detail with reference to FIGS. 8A and 8B, in a preferred embodiment of the present invention, a fluid flow meter 800 is coupled to and thereby in fluid contact with the manifold assembly 210 through the fluid input port 214. In this preferred embodiment, the fluid flow meter 800 directly measures the volume of fluid which flows through a fluid line 810 that is in fluid contact between the regulator 212 and the fluid input port 214 as shown in FIG. 3. The fluid flow meter 800 thereby measures the volume of fluid that flows from the holding tank 209 to the manifold assembly 210. In an alternative embodiment, the fluid flow meter 800 can be coupled to and thereby be in fluid contact with the manifold assembly 210 at a fluid dispensing port 233 (FIGS. 4 and 5) of the manifold 213. As described below in more detail, the fluid flow meter directly measures the volume of fluid that flows from the holding tank 209, through the manifold assembly 210, and out of the fluid dispensing port 233.

Figure 4:
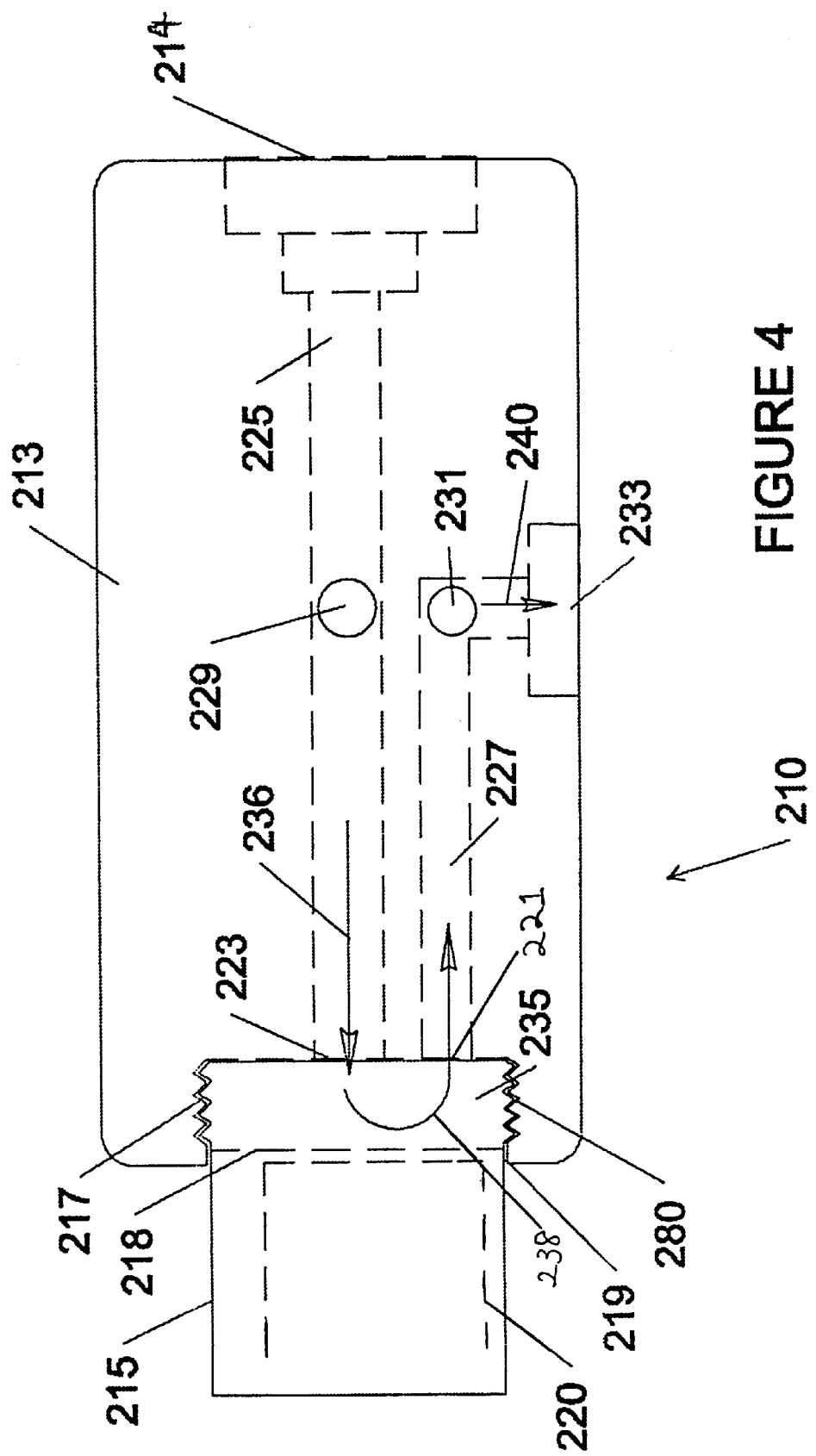
FIG. 4 illustrates the structural relationship between the manifold of the present invention and an electrically operated solenoid with the solenoid in a first position.
Figure 5:
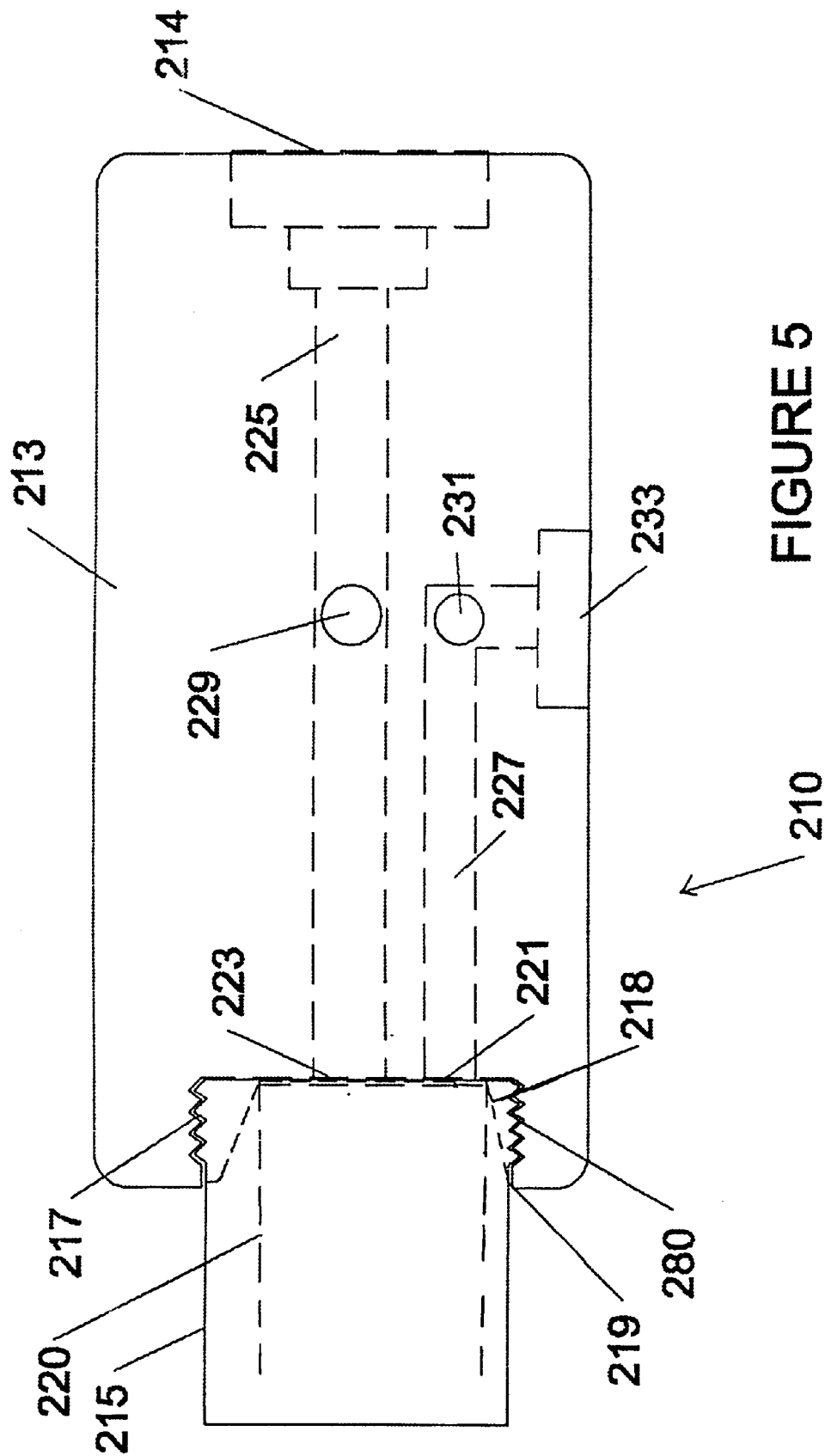
FIG. 5 illustrates the structural relationship between the manifold of the present invention and an electrically operated solenoid with the solenoid in a second position.

FIGS. 4 and 5 illustrate the structural relationship between the manifold 213 and an electrically operated solenoid 215 (such as part no. G971312-13-5VDC distributed by KIP Manufacturing of Santa Ana, Calif.). The manifold 213 is housed within the upper portion 104 of the housing 102. The solenoid 215 is mechanically coupled to the manifold 213. The manifold is preferably machined to include the first fluid input port 214, a threaded recess 219, an input fluid port 221, an output fluid port 223, a first fluid passage 225, a second fluid passage 227, a first pressure measurement port 229, a second pressure measurement port 231, and a fluid dispensing port 233.

In accordance with one embodiment of the present invention, the solenoid 215 has external threads 217 provided at a proximal end of the solenoid 215. The external threads 217 mate with internal threads 280 provided in the recess 219 in the manifold 213. The solenoid 215 includes a piston 220 which is covered with a resilient boot 218. When properly seated within the manifold 213 (i.e., screwed tightly into the manifold 213) and with the solenoid 215 in a first position (i.e., the piston within the solenoid 215 retracted, as shown in FIG. 4), fluid enters the manifold through the input port 214 from the pressurized holding tank 209, and flows through the passage 225 to the output port 223. Because the solenoid 215 is in the first position, the fluid flows through the port 223 into a chamber 235 formed between the solenoid 215 and the interior walls of the recess 219 (as indicated by fluid direction arrow 236). The fluid then flows from the chamber 235 back into the manifold 213 via fluid port 221 (as indicated by fluid direction arrow 238) and along the passage 227 to the dispensing port 233 (as indicated by fluid direction arrow 240).

In accordance with the preferred embodiment of the present invention, a conduit is coupled to the dispensing port 233. A removable tip 216 (see FIG. 3) is preferably coupled to the conduit to allow the tip 216 to be cleaned or replaced as necessary. The tip 216 is preferably shaped to facilitate mixing the fluid to be dispensed with other substances that are present in a container into which the fluid is dispensed. In accordance with one embodiment of the present invention the tip 216 has a generally helical interior to cause the fluid to swirl as it is dispensed. In another embodiment of the present invention, the distal end of the tip has multiple relatively small openings from which fluid is dispensed. In yet another embodiment of the present invention, the interior flowpath through the tip 216 is tapered such that the proximal end which is coupled to the dispensing port 233 is narrower than the distal end from which the fluid is dispensed. Accordingly, in this embodiment, the tip 216 diffuses the pressure. In accordance with one embodiment, the tip 216 is fabricated from an antibacterial plastic.

The solenoid 215 is preferably electrically controlled by a central control device (discussed in detail below) to drive the piston 220 into a second position in which the piston 220 drives into contact with the boot 218, and forces the boot 218 into contact with the fluid input and output ports 221, 223, respectively (as shown in FIG. 5). Accordingly, fluid that formerly flowed through the passage 225 and into the passage 227 is blocked by the boot 218 which seals the ports 221, 223. Accordingly, the combination of the solenoid and the ports 221, 223 of the manifold form a fluid flow control device 607 (see FIG. 6, described below). In an alternative embodiment of the present invention, the fluid flow control device 607 may be implemented in any other manner that can selectively allow and prevent fluid from flowing from the pressurized holding tank 209 to a dispensing port.

In addition, a pressure measurement device 237 (FIG. 6), such as a transducer part no. XCA-5, distributed by Data Instruments of Acton, Mass. is coupled to the pressure measurement ports 229 and 231 in the manifold 213 (FIGS. 4 and 5). The pressure measurement device 237 detects the fluid pressure that exists within the passage 225 with respect to the pressure that is present in the path 227 and converts that pressure into an electrical signal.

FIG. 6 is a simplified block diagram of the electrical interconnection between components of one embodiment of the present invention. A central control device 601, such as a microprocessor, microcontroller, state machine, general purpose computer, discrete logic circuit, or ASIC (application specific integrated circuit) is provided which controls the fluid flow control device 607 and the output device 103. In accordance with one embodiment of the present invention, the central control device 601 receives inputs from the user input device 101, a bar code scanner 802, a memory device 605, the pressure measurement device 237, and a purity sensor 603. In one embodiment, the central control device 601 controls the operation of the bar code scanner 802. In an alternative embodiment, the central control device 601 receives inputs from one or more additional data input devices 804. The data input devices 804 provide alternative means for inputting the amount of fluid to be dispensed by the fluid dispenser of the present invention. The data input devices 804 may be connected to control device 601 by any convenient means including electrical serial and parallel ports, infrared, and optical connections.

The user input device 101 provides a mechanism by which the user can input information indicating the amount of fluid the user desires to have dispensed. In accordance with one embodiment of the present invention, the user input device includes a keypad with numeric keys for indicating numerically the amount of fluid to be dispensed. The keypad also preferably includes a dedicated "Fill" button, the function of which will be described in greater detail below.

The user output device 103 communicates information to the user, such as indications that information entered by the user has been properly accepted and indications that a failure condition has occurred. The user output device 103 is preferably an LCD device. However, individual LEDs, a CRT (cathode ray tube), a speaker, a memory device onto which information can be recorded, or any other conventional output device can be used. Preferably, the output device allows the user to essentially immediately sense the status of the dispenser. In one embodiment of the present invention, the user output device 103 provides audible or verbal information to the user. For example, in this embodiment, the user output device 103 allows the present invention to verbally inform the user of the dispenser's status. In one alternative embodiment, for example, the dispenser will verbally warn the user that an expired medication has been scanned and that the user should discard the medication.

The memory device 605 is preferably physically located within a power pack. The memory device 605 is preferably an EEPROM (electrically erasable programmable read only memory) device. However, in accordance with an alternative embodiment of the present invention, the memory device 605 is a RAM (random access memory), ROM (read only memory), disk drive, tape drive, flash memory, optical memory, or any other conventional mechanism for storing information. In accordance with one embodiment in which the central control device is a programmable circuit, such as a microprocessor, the memory device 605 preferably stores the program instructions which are to be executed by the central control device 601. In addition, the memory device 605 preferably stores information that is used by the central control device 601 to determine when a failure condition has occurred, such as when the filter assembly 200 requires service, a threshold used to determine when the power source is not supplying a sufficient amount of power, a threshold used to indicate when the purity of the fluid is unacceptable, and a threshold used to determine when the pressure in the pressurized holding tank is too great or too low. In addition, a "Start-up" code is preferably stored within the memory device 605.

The pressure measurement device 237 allows the central control device 601 to monitor the pressure that the fluid is under when the fluid is to be dispensed. In accordance with one embodiment of the present invention, the amount of fluid that is dispensed is controlled by controlling the pressure to which the fluid is subjected, an orifice through which the fluid passes (preferably the orifice is coincident with the dispensing port 233 in the manifold 213), and the amount of time the fluid flow control device 607 allows fluid to flow. Therefore, in accordance with one embodiment of the present invention, if the pressure measurement device 237 indicates to the central control device 601 that the pressure is either too great or too low, then the central control device 601 will not dispense fluid. That is, the central control device causes the user output device 103 to indicate an alarm condition, rather than causing the fluid flow control device to allow fluid to flow. In an alternative embodiment, the central control device 601 causes the user output device 103 to indicate the pressure, and adjusts the amount of time that the fluid flow control device allows fluid to flow through the orifice in the manifold in order to account for the change in pressure.

In one embodiment of the present invention, the memory device 605 includes a "subtraction" look-up table. The subtraction look-up table contains information which aids the control device 601 in determining the amount of time it should allow fluid to flow through the dispensing port in order to dispense the requested volume of fluid. The subtraction look-up table includes a series of entries which are indexed or "addressed" by the binary equivalent of the pressure measured by the pressure measurement device 237. Depending upon the pressure measurement output by device 237, different look-up table entries are output to the control device 601. As described below, the entries comprise "subtraction volume" measurements which aid in the dispensed fluid volume determination process. For each pressure value measured by the measurement device 237, a "subtraction volume" entry is provided to the control device 601.

In this embodiment, the control device first receives a request for a selected desired volume of fluid to be dispensed. This request may be generated by the user (via the user input device 101) or by one of the other input devices 802 or 804. In order to accurately dispense the selected volume, the control device 601 first obtains a pressure measurement from the measurement device 237. If the measurement is within an acceptable pre-determined range, the control device causes the fluid control device 607 to activate the solenoid 215 (FIG. 4), thereby allowing fluid to flow through the dispensing port 233 (FIG. 4) and out through the removable tip 216. Once fluid begins to flow, the control device 601 begins a "subtraction" process to determine when to stop fluid flow. The subtraction process comprises the following steps: (a) addressing the subtraction look-up table at pre-determined intervals using the pressure measurement (obtained from the measurement device 237) as an index to the table; (b) reading the look-up table entry (subtraction volume entry) that was addressed in step (a); (c) subtracting the subtraction volume entry from the desired volume initially requested, the result of the subtraction referred to as the resultant volume; and (d) repeating steps (a)–(c) until the resultant volume equals zero. When the resultant volume equals zero, the control device 601 causes the fluid flow control device 607 to stop the flow of fluid.

Using the subtraction look-up table approach of this embodiment, the control device is able to accurately dispense the requested volume of fluid under slightly varying pressure conditions. In one embodiment, the pre-determined time intervals of step (a) of the subtraction process (i.e., the frequency that the look-up table is addressed) is 10 ms. By keeping the addressing time interval constant, and by varying the subtraction volume entries based upon the pressure measured in the fluid line, the invention can accurately determine the amount of time to allow fluid to flow out through the removable tip 216. The subtraction volume entries are based upon fluid dynamics characteristics of the manifold assembly and vary slightly depending upon system configuration.

In another alternative embodiment of the present invention, only the central control device 601, the fluid flow control device 607, and a user input device (which may be as simple as a start button) are provided. When the user initiates a dispensing operation through the user input device, the central control device causes the fluid flow control device 607 to allow fluid to flow through the orifice for a predetermined amount of time. In accordance with one embodiment, the amount of fluid that is dispensed is relatively small to allow for good resolution in the amount of fluid that can be dispensed. That is, if the dispenser outputs 50 milliliters each time the user initiates a dispensing operation, then the user may have any multiple of 50 milliliters dispensed by repeatedly initiating the dispensing operation. While such an embodiment simplifies and reduces the cost of the dispenser, it will be understood that in the preferred embodiment, the user can input an exact amount of fluid to be dispensed with a resolution of 1 milliliter. In accordance with one embodiment of the present invention, a sterilizer is provided to allow the dispenser to dispense sterilized water, as well as filtered water.

Figure 7A:
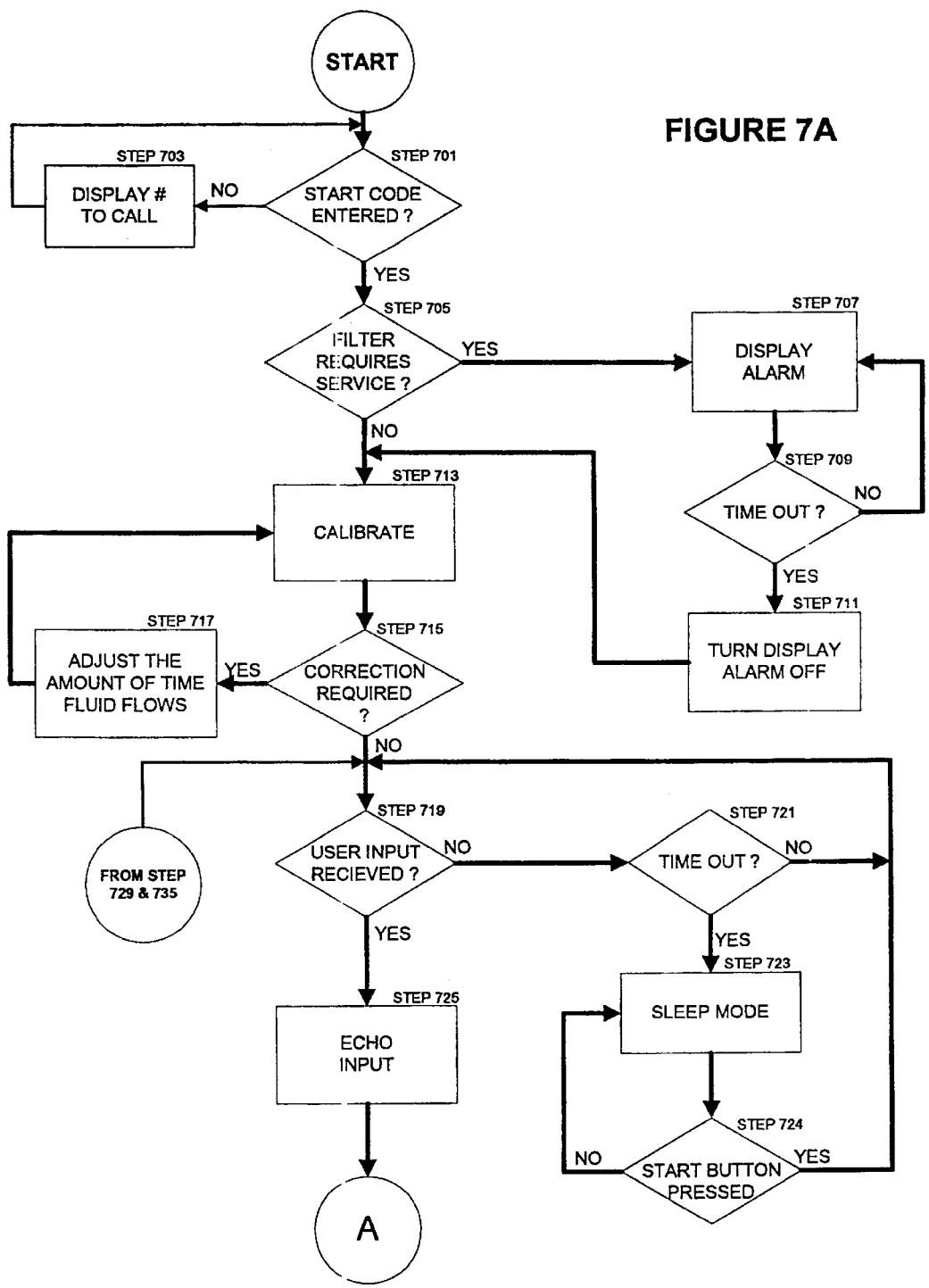
FIGS. 7A and 7B are a flow chart of the steps that are performed by a central control device in accordance with one embodiment of the present invention.
Figure 7B:
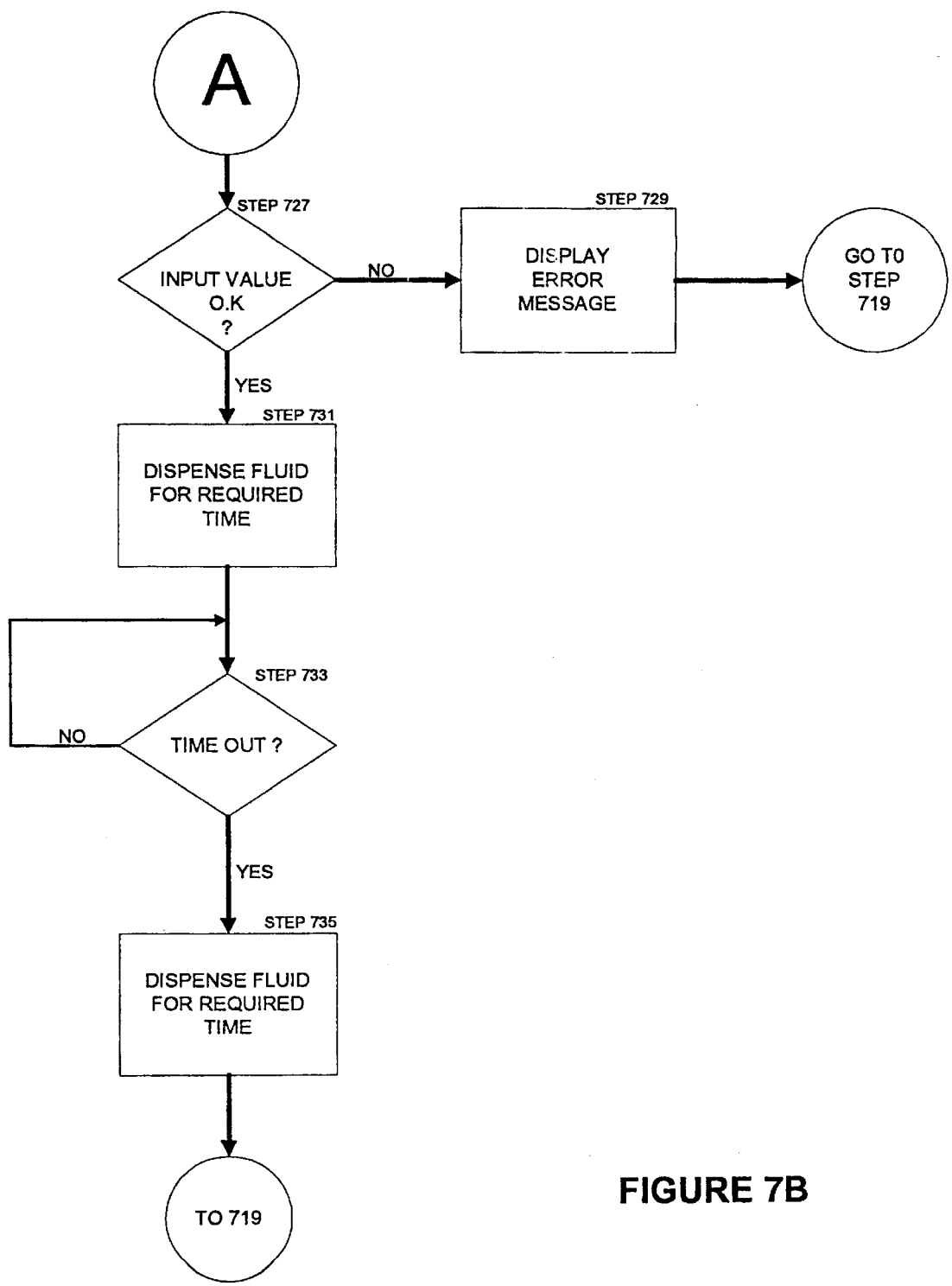

FIGS. 7A and 7B are a flow chart of the steps that are performed by the central control device 601 in accordance with one embodiment of the present invention. The method shown in FIG. 7 starts when power is initially applied to the dispenser. The central control device 601 checks whether a Start-up code was ever entered (STEP 701). The Start-up code preferably provides information to the central control device 601 to enable it to determine initial values and thresholds so that the central control device 601 can determine whether an alarm condition exists. For example, in accordance with the preferred embodiment of the present invention, the Start-up code provides the central control device with information as to when the filters were last serviced.

In an alternative embodiment of the present invention, the Start-up code also provides the central control device with other information including:(1) thresholds for purity, (2) the duration of time which may elapse between servicing the filters, and (3) the amount of fluid which may be dispensed between servicing the filters. The information provided within the Start-up code is preferably stored in the memory device 605. If the Start-up code has not yet been entered, then the central control device 601 preferably causes the output device 103 to display a telephone number which the user is to call in order to get the Start-up code of the dispenser (STEP 703).

Once the user receives the required Start-up code, the user enters the Start-up code through the user input device 101. Once the Start-up code has been entered (STEP 701), the central control device 601 checks the status of the filter assembly 200 to determine whether the filter assembly 200 requires service (STEP 705). If the filter assembly 200 requires service, then the central control device 601 preferably causes the output device to flash an alarm code for a predetermined amount of time to alert the user that service is required (STEP 707). Once the time has expired (STEP 709), the display ceases displaying the alarm message (STEP 711). In accordance with one embodiment of the present invention, the output device will flash an alarm message for three seconds every time a user attempts to dispense fluid.

The central control device will then preferably enter a calibration mode (STEP 713) during which the dispenser will attempt to dispense a predetermined amount of fluid. The user must place a container under the dispensing port 233 and measure the amount of fluid that is dispensed to determine whether the dispenser has dispensed the predetermined amount within a predetermined tolerance. If the amount of fluid that is dispensed is not within tolerance, then a correction is required. The user inputs a correction to the central control device 601 through the user input device 101. Upon receiving the correction input from the user (STEP 715), the central control device 601 adjusts the relationship between the volume of fluid that is requested to be dispensed, and the amount of time the central control device allows fluid flow in order to dispense the requested volume of fluid. In accordance with one embodiment of the present invention, the calibration process is repeated until the volume of fluid that is dispensed is within tolerance (STEP 717).

In an alternative embodiment, the amount of time that the control device 601 allows fluid to flow is implemented using the subtraction look-up table approach and subtraction process described above with reference to FIG. 6. In the preferred embodiment, as described below in more detail with reference to FIGS. 8A and 8B, the amount of time that the control device 601 allows fluid to flow is dependent upon the volume of fluid measured by a fluid flow meter 800. In this embodiment, the control device 601 allows fluid to flow out through the removable tip 216 until it determines that the required dispensed fluid volume was detected by the fluid flow meter 800.

When no correction is required (STEP 715), the central control device awaits an input from a user (STEP 719). The central control device starts a timer. The central control device awaits expiration of the timer (STEP 721). If no input is received before the timer expires, then the central control device enters a "sleep" mode (STEP 723). In sleep mode, all non-essential functions cease, and all displays are turned off to conserve power. Once in sleep mode, the user must press the "Start" button on the keypad to awake the processor (STEP 724). If the Start button is pressed, the central control device awaits a user input. When a user input is detected (STEP 719), the input is echoed on the user output device 103 to allow the user to verify that the input was properly received (STEP 725). If the value input by the user is not a valid quantity of fluid to be dispensed (STEP 727), then an error message is displayed on the user output device 103. The user can then reenter the amount (STEP 719). If, on the other hand, the amount entered by the user is a valid value (STEP 727), then the central control device sends a signal to the fluid flow control device 607 to cause the fluid flow control device 607 to allow fluid to be dispensed (STEP 731) for the amount of time required to dispense a portion of the requested amount of fluid. The central control device 601 then preferably waits a predetermined amount of time (STEP 733) to allow the user to mix the fluid with a medication (e.g., stir dispensed filtered water and medication). The predetermined amount of time may be either (1) provided by the user, (2) set within the program stored in the memory device 605, or (3) loaded as part of the Start-up code. In any case, the amount of time may be altered by the user through the user input device 101. The central control device 601 does not recognize inputs from the user input device 101 during this waiting period. Once the wait period has expired, the central control device 601 awaits an input from the user input device 101 before completing the dispensing operation and dispensing the remainder of the requested fluid (STEP 735). The central control device then awaits the next user input (STEP 719).

As described above, the amount of time required to dispense the requested amount of fluid (STEPS 731 and 735) is determined in an alternative embodiment using the subtraction look-up table approach and subtraction process described above with reference to FIG. 6. However, in the preferred embodiment, and as described below with reference to FIGS. 8A and 8B, the amount of time that the control device 601 allows fluid to flow is dependent upon the volume of fluid flow as measured by a fluid flow meter 800.

FIGS. 8A and 8B shows details of the fluid flow meter 800 shown in FIG. 6. FIG. 8A shows a perspective view of the fluid flow meter 800 adapted for use with the present invention. FIG. 8B is a cross-sectional view of the fluid flow meter 800 taken along a plane that is perpendicular to the fluid line 810 (FIG. 3) showing details of the fluid meter 800 not shown in FIG. 8A. As described above with reference to FIG. 3, the fluid flow meter 800 is preferably placed in fluid contact with the fluid line 810 which connects the regulator 212 to the fluid input port 214 of the manifold 213. During fluid flow, the fluid line 810 carries fluid from the holding tank 209 to the manifold assembly 210. As shown in FIG. 8A, the fluid meter 800 preferably includes an input port 820 and an output port 822. The input and output ports 820, 822 preferably include fluid couplings 824, 826, respectively, designed to couple the fluid flow meter with the fluid line 810. In the preferred embodiment of the present invention, the input port 820 is coupled (via the fluid coupling 824) to the fluid line 810 and is in fluid contact with the regulator 212 (FIG. 3). The output port 822 is coupled to the fluid line 810 and is in fluid contact with the input port 214 of the manifold 213.

In an alternative embodiment, the flow meter 800 can be positioned between the manifold output fluid port 233 and the removable tip 216. In this embodiment, the meter input port 820 is in fluid contact with the manifold output port 233, and the meter output port 822 is in fluid contact with the removable tip 216.

The fluid flow meter 800 preferably includes a flow measurement rotor 830 (FIG. 8B) which rotates due to fluid flow through the fluid flow meter 800. The flow measurement rotor is encased by a translucent flow measurement casing 832. The fluid flow meter 800 preferably includes an emitter/detector clip 834 which is mechanically coupled to the measurement casing 832. The emitter/detector clip 834 preferably includes an infrared emitter positioned on a first clip tine 836 and a detector positioned on a second clip tine 838. The emitter is positioned on the tine 836 in such a manner as to be optically aligned with the detector. When the clip 834 is mechanically coupled to the casing 832, the emitter projects an infrared light beam through the translucent casing 832 and onto the rotor 830. As described below with reference to FIG. 8B, the rotor 830 is constructed such that it alternatively interrupts and passes the emitted beam to the detector during rotation.

As shown in FIG. 8B, the rotor 830 is mounted perpendicularly to the input and output ports 820, 822. The rotor 830 rotates on a virtually friction-free bearing. As fluid flows through the flow meter 800, the rotor 830 rotates at a frequency that is proportional to the volume of fluid passing through the flow meter 800. The rotor contains a slit in one of its blades (not shown) that alternatively interrupts and passes the infrared beam from the emitter to the detector when the rotor rotates. In the preferred embodiment of the present invention, the detector generates a digital square wave signal that is representative of the number of rotations made by the rotor 830. The signal generated by the detector is output to the central control device 601 (FIG. 6). Thus, using the fluid flow meter 800, the central control device 601 is able to directly measure the volume of fluid that passes through the fluid line 810. This measurement aids the central control device 601 in determining the amount of time it should allow fluid to flow during a fluid dispensing operation.

In the preferred embodiment the fluid flow meter 800 is implemented using commercially available flow meters adapted for use with the present invention. In one such preferred embodiment the fluid flow meter comprises a DigiFlow Flow Meter, part no. DFS-3 distributed by Digi-Flow Systems of Mansfield, Ohio. However, other commercially available flow meters can be used to measure the flow of fluid through the fluid line 810.

As described above with reference to FIG. 6, one alternative embodiment of the present invention includes a bar code scanner 802. The bar code scanner 802 enables the automated input of information pertaining to medications that require reconstitution. As described above in the background of the invention, many medication containers are bar coded with information pertaining to the medication. For example, many medications are coded with a United States National Drug Category (NDC) number which, in addition to other information, identifies the manufacturer, the medication type, dosage strength, and expiration date of the medication. This coded information contains most of the data necessary to accurately reconstitute the associated medications with filtered water. Reference information is publicly available which, for a known medication type having a given dosage, dictates the amount of filtered water necessary to reconstitute the medication. The bar code scanner 802 provides a means for inputting the coded medication data into the fluid dispenser 100, and more particularly, into the central control device 601 (FIG. 6).

Figure 9:
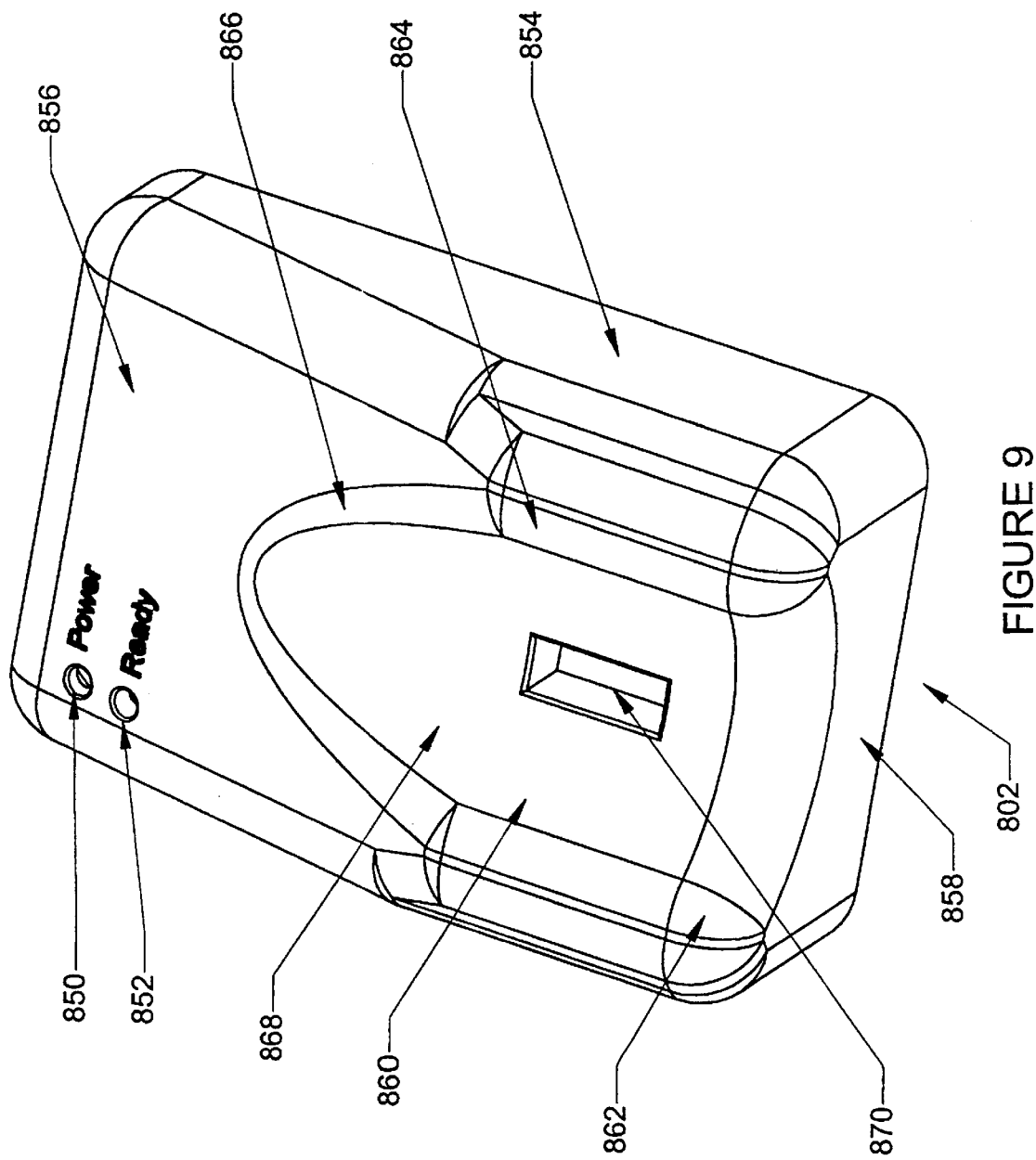
FIG. 9 is a perspective view of a bar code scanner used in an alternative embodiment of the present invention.

A bar code scanner 802 adapted for use with the preferred embodiment is shown in FIG. 9. The bar code scanner 802 preferably includes a "power" indicator 850 and a "ready" indicator 852. In the preferred embodiment, the scanner is powered by a dedicated power source such as a battery or an alternating current supply. In an alternative embodiment, the scanner uses the same power supply used by the fluid dispenser 100. The power indicator 850 indicates when the scanner 802 is sufficiently powered by the power source. The ready indicator 852 indicates when the scanner 802 is prepared to accurately scan the medication container. These indicators are intended to be seen by a user such as a pharmacist, and will warn the user of faulty scanner operation.

As shown in FIG. 9, the bar code scanner 802 preferably includes a housing 854 having a top surface 856 and a front surface 858. The housing 854 preferably has a medication container recess 860 formed into the top surface 856 proximate the front surface 858 as shown in FIG. 9. The container recess 860 is preferably shaped to receive a medication container (not shown) and includes a pair of opposing side walls 862, 864, a rear wall 866, and a bottom surface 868. The side walls 862, 864 and the rear wall 866 of the recess 860 are preferably inclined at a slight angle with respect to the bottom surface 868. Thus, the container recess 860 is conveniently shaped to receive medication containers requiring reconstitution.

A bar code reader portal 870 is formed in the bottom surface 868 of the recess 860. The reader portal 870 permits a bar code reader optical access to the container recess 860. Any commercially available bar code reader can be used with the present invention. In typical use, a user, usually a pharmacist, places a medication container in the recess 860 with the container's bar code facing in a downward direction toward the portal 870. The user then presses a "Scan" button on the user input device 101 (FIG. 1) to initiate a scanning process. The bar code is scanned through the reader portal 870 by the bar code reader in a well-known manner and the coded information pertaining to the medication is output to the central control device 601 (FIG. 6). In one embodiment, the bar code scanner 802 is electrically coupled to the dispenser 100 using a commercially available connector such as an R10-base-T or RJ45 connector.

In one embodiment, the control device 601 determines if a good scan was performed by the scanner 802 (i.e., if the scanner 802 accurately scanned the bar code). If a good scan was performed, the control device causes a "good scan" indication to be displayed on the output device 103. In contrast, if the control device 601 determines that a bad scan was performed (i.e., the scanner 802 inaccurately scanned the bar code), the control device notifies the user of that development using the output device 103. In this case, the user is instructed by the dispenser 100 to retry the scanning process. In an alternative embodiment, the scanner 802 independently monitors good and bad scans and only outputs accurately scanned data to the central control device 601. In this alternative embodiment, the scanner 802 uses its ready indicator 852 to notify the user of scan outcomes. In yet another alternative, the dispenser notifies the user of scan outcomes using a speaker or other audible output means.

Once accurately scanned coded medication data is input to the central control device 601, the control device 601 accesses the memory device 605 (FIG. 6) to determine how much filtered water is required to reconstitute the scanned medication. The memory device 605 preferably includes a medication look-up table. The medication look-up table is addressed using the coded information obtained from the scanner 802 as an index to the table. The look-up table contains entries indicating the amount of filtered water required to reconstitute a given medication having a given dosage strength, and manufactured by a given manufacturer. The entries are compiled using well known references commonly referred to in the art as "national formulary". Therefore, given a scanned medication type, manufacturer, and dosage, the amount of filtered water necessary to reconstitute the medication is thereby obtained by the central control device 601 from the memory device 605. Once the control device 601 obtains this information, it instructs the user to place the container on the dispenser shelf 113 (FIG. 1) and then to press the Fill button on the user input device 101. When the user presses the Fill button the dispenser 100 outputs the amount of filtered water necessary to reconstitute the scanned medication in accordance with the dispensing operation described above with reference to FIGS. 3–8.

In an alternative embodiment of the present invention, the bar code scanner housing 854 is shaped to accommodate a wide range of container shapes. In addition, the present invention is not limited to the scanner 802 shown in FIG. 9. Any scanner capable of reading the well-known bar code information can be used with the present invention, including hand held laser scanners, portable data collection terminals, scanning wands, and omnidirectional fixed and projection scanners. Furthermore, the present invention can use any input means capable of reading data encoded using alternative methods. For example, in alternative embodiments wherein data is encoded on a magnetic stripe, the present invention uses a magnetic stripe reader to input the coded data to the fluid dispenser 100.

Summary

A number of embodiments of the present invention have been described. Nevertheless, it will be understood that various modifications may be made without departing from the spirit and scope of the invention. For example, while the present invention is described primarily as being for use in the pharmaceutical industry, the present invention may be used to dispense fluid in any context, unless otherwise specified in the limitations of the claims. It should be noted that the present invention would be useful in health care institutions, such as hospitals and doctors' offices, as well as in research laboratories. Accordingly, it is to be understood that the invention is not to be limited by the specific illustrated embodiments, but only by the scope of the appended claims.

What is claimed is:

1. A portable automated fluid dispenser for automatically dispensing a selectable and variable volume of fluid, including:
   (a) a manifold having a fluid passage for selectively allowing fluid to flow through the manifold, wherein the fluid passage has a fluid input port and a fluid output port;
   (b) a valve disposed in the manifold for controlling the flow of fluid from the fluid input port to the fluid output port;
   (c) a fluid measurement device, operatively connected to the fluid passage, for measuring a delivered volume of fluid dispensed, wherein the fluid measurement device is capable of measuring the delivered volume of fluid to an accuracy of approximately 1 milliliter:
   (d) a control device operatively coupled to the valve and the fluid measurement device, the control device selectively causing the valve to open, and then to close after a selected volume of fluid has been dispensed as determined by the fluid measurement device; and
   (e) a data input device, operatively coupled to the control device, wherein the data input device specifies the selected volume of fluid to be dispensed by the portable automated fluid dispenser, and wherein the selected volume of fluid can be specified with a resolution of approximately 1 milliliter.

2. The portable automated fluid dispenser of claim 1, wherein the fluid measurement device comprises a pressure measurement device for obtaining a fluid pressure measurement within the fluid passage, and wherein the control device utilizes the fluid pressure measurement to determine a period of time, the period of time being directly proportional to a selected volume of fluid requiring dispensing, and wherein the control device selectively causes the valve to open for the determined period of time such that the selected volume of fluid is dispensed by opening the valve for the period of time and thereafter closing the valve.

3. The dispenser of claim 2, further including a user input device operatively coupled to the control device, the user input device allowing a user to specify to the control device the selected volume of fluid to be dispensed.

4. The dispenser of claim 3 further including a memory device, wherein the control device will not allow the valve to open unless a user enters a code which is stored in the memory device.

5. The dispenser of claim 4, wherein the code includes the date on which a filter that is in fluid communication with the dispenser was last serviced, and wherein the code also includes a status of the filters on the date that the dispenser was last serviced.

6. The dispenser of claim 2, further including a display device electrically coupled to the control device, wherein the display device receives signals from the control device causing the display to indicate the selected volume of fluid to be dispensed.

7. The dispenser of claim 2, further including a display device electrically coupled to the control device, wherein the display device receives signals from the control device causing the display to indicate when a predetermined fluid quality falls below a predetermined level.

8. The dispenser of claim 2, wherein the control device prevents fluid dispensing if a failure condition is detected by the control device.

9. The dispenser of claim 8, wherein the failure condition includes a power supply within the dispenser being below a predetermined power level.

10. The dispenser of claim 2, further including a fluid quality measurement device.

11. The dispenser of claim 2, further including a user input device operatively connected to the control device, wherein the control device opens the valve to dispense a first portion of a selected volume of fluid in response to the user activating the user input device a first time, and wherein the control device opens the valve to dispense a second portion of the selected volume of fluid in response to the user activating the user input device a second time.

12. The dispenser of claim 2, further including a memory device operatively coupled to the control device.

13. The dispenser of claim 12, further including program instructions executed by the control device, the program instructions being stored within the memory device.

14. The dispenser of claim 12, wherein the memory device includes information used by the control device to determine when filters within the dispenser require service.

15. The dispenser of claim 12, wherein the memory device contains information used by the control device to determine an amount of time to keep the fluid control device open and thereby dispense the selected volume of fluid.

16. The dispenser of claim 15, wherein the information is contained in a look-up table.

17. The dispenser of claim 16, wherein the look-up table includes entries specifying the selected volume of fluid to be dispensed based upon a selected medication having a selected dosage strength and manufactured by a selected manufacturer.

18. The dispenser of claim 13, wherein the program stored within the memory device includes instructions for performing the following steps:
 (a) receiving a user input;
 (b) in response to the user input, opening a valve;
 (c) measuring an elapsed time starting from the time at which the valve is opened; and
 (d) closing the valve after a predetermined amount of time has elapsed.

19. The dispenser of claim 13, wherein the program stored within the memory device includes instructions for performing the following steps:
 (a) receiving a first user input;
 (b) in response to the first user input, opening a valve;
 (c) measuring a first elapsed time starting from the time at which the valve is opened in response to the first user input;
 (d) closing the valve after a first predetermined amount of time has elapsed and awaiting a second user input;
 (e) receiving a second user input;
 (f) in response to the second user input, opening the valve;
 (g) measuring a second elapsed time starting from the time at which the valve is opened in response to the second user input; and
 (h) closing the valve after a second predetermined amount of time has elapsed.

20. The portable automated fluid dispenser of claim 1, wherein the fluid measurement device comprises a fluid flow meter.

21. The dispenser of claim 20, wherein the selected volume of fluid dispensed by the dispenser is monitored by the control device using input obtained from the fluid flow meter.

22. The dispenser of claim 1, wherein the data input device comprises a bar code scanner.

23. The dispenser of claim 22, wherein the bar code scanner reads coded information pertaining to a medication requiring reconstitution, and wherein the central control device determines the predetermined amount of fluid to be dispensed based upon the coded information.

24. A portable automated fluid dispenser for automatically dispensing a selectable and variable volume of fluid, including:
 (a) a valve means for allowing fluid to flow and for restricting the flow of fluid;
 (b) a fluid measurement means for measuring a volume of fluid dispensed, wherein the fluid measurement means is capable of measuring the volume of fluid to an accuracy of approximately 1 milliliter;
 (c) a control means, coupled to the fluid measurement means and valve means, for causing the valve means to prevent fluid flow after a selected volume of fluid has been dispensed as determined by the fluid measurement means; and
 (d) a data input means, operatively coupled to the control means, for specifying the selected volume of fluid to be dispensed by the fluid dispenser, wherein the selected volume of fluid can be specified with a resolution of approximately 1 milliliter.

25. The portable automated fluid dispenser of claim 24, wherein the data input means comprises a bar code scanner.

26. A method for automatically dispensing a selectable and variable volume of fluid, including the steps of:
 (a) receiving an input from a data input device, wherein the input indicates a desired volume of fluid to be dispensed, and wherein the desired volume of fluid is specified with a resolution of approximately 1 milliliter,
 (b) in response to the data input, opening a valve;
 (c) measuring fluid flow until the desired volume of fluid is dispensed, wherein the desired volume of fluid dispensed is measured to an accuracy of approximately 1 milliliter; and
 (d) closing the valve after the desired volume of fluid has been dispensed.

* * * * *